US012623966B2

(12) United States Patent
Kraemer et al.

(10) Patent No.: US 12,623,966 B2
(45) Date of Patent: May 12, 2026

(54) TERNARY HYDRAULIC BINDER COMPOSITION

(71) Applicant: SIKA TECHNOLOGY AG, Baar (CH)

(72) Inventors: Christina Kraemer, Augsburg (DE);
Alexander Dressen, Augsburg (DE);
Wilhelm Fuetterer, Augsburg (DE);
Stephan Rudolf, Augsburg (DE);
Guenter Goth, Augsburg (DE);
Torsten Mueller, Augsburg (DE);
Yvonne Schaepers, Augsburg (DE);
Alexander Ehle, Augsburg (DE);
Ulrich Baeurle, Augsburg (DE);
Werner Stohr, Augsburg (DE)

(73) Assignee: Sika Technology AG, Baar (CH)

( * ) Notice: Subject to any disclaimer, the term of this
patent is extended or adjusted under 35
U.S.C. 154(b) by 283 days.

(21) Appl. No.: 18/269,420

(22) PCT Filed: Dec. 23, 2021

(86) PCT No.: PCT/EP2021/087441
§ 371 (c)(1),
(2) Date: Jun. 23, 2023

(87) PCT Pub. No.: WO2022/136620
PCT Pub. Date: Jun. 30, 2022

(65) Prior Publication Data
US 2025/0320160 A1 Oct. 16, 2025

(30) Foreign Application Priority Data

Dec. 23, 2020 (EP) ..................................... 20216954

(51) Int. Cl.
| | |
|---|---|
| *C04B 28/16* | (2006.01) |
| *C04B 14/06* | (2006.01) |
| *C04B 103/12* | (2006.01) |
| *C04B 103/14* | (2006.01) |
| *C04B 103/20* | (2006.01) |

(52) U.S. Cl.
CPC .............. *C04B 28/16* (2013.01); *C04B 14/06*
(2013.01); *C04B 2103/12* (2013.01); *C04B*
*2103/14* (2013.01); *C04B 2103/20* (2013.01)

(58) Field of Classification Search
CPC ..... C04B 28/16; C04B 14/06; C04B 2103/12;
C04B 2103/14; C04B 2103/20
See application file for complete search history.

(56) References Cited

U.S. PATENT DOCUMENTS

| | | | |
|---|---|---|---|
| 6,730,162 B1 | 5/2004 | Li et al. | |
| 2015/0329422 A1* | 11/2015 | Grelaud | .................. C04B 28/04 |
| | | | 106/695 |
| 2016/0107933 A1 | 4/2016 | Schmitt et al. | |
| 2016/0207834 A1* | 7/2016 | Bullerjahn | ............ C04B 28/105 |
| 2021/0155540 A1* | 5/2021 | Walenta | .................... C04B 7/52 |

FOREIGN PATENT DOCUMENTS

| | | | |
|---|---|---|---|
| CA | 2922773 A1 | 3/2015 | |
| CN | 1966449 A | 5/2007 | |
| CN | 109987906 A | 7/2019 | |
| DE | 10 2010 034 874 A1 | 2/2012 | |
| EP | 3461800 A1 * | 4/2019 | ............ C04B 28/16 |
| GB | 5022 | 12/1824 | |
| JP | H09-86989 A | 3/1997 | |
| WO | 01/74737 A1 | 10/2001 | |
| WO | 2012/127066 A1 | 9/2012 | |
| WO | 2015/032484 A1 | 3/2015 | |

OTHER PUBLICATIONS

Chu et al., "Properties of Shrinkage Reducing Agent and Mortar
with C12A7-based Slag and Petroleum Cokes Ash," Journal of the
Korean Ceramic Society, 2013, vol. 50, No. 5, pp. 319-325.
Mar. 15, 2022 International Search Report issued in International
Patent Application No. PCT/EP2021/087441.
Mar. 15, 2022 Written Opinion issued in International Patent
Application No. PCT/EP2021/087441.

* cited by examiner

*Primary Examiner* — Anthony J Green
(74) *Attorney, Agent, or Firm* — OLIFF PLC.

(57) ABSTRACT

A ternary hydraulic binder composition including the min-
eralogical compound $C_4A_3\$$ (ye'elimite) and a member
selected from the group consisting of gypsum, calcium
sulfate hemihydrate, anhydrite and mixtures thereof (collec-
tively named $C\$H_x$ with x being a rational number from 0 to
2), and optionally $C_2S$ (belite), including an added content
of the mineralogical compound $C_{12}A_7$ (dodecacalcium hep-
taaluminate). Moreover, it suggests a process for the manu-
facture thereof, a process for the manufacture of a construc-
tion chemical composition including water, and the use of
the ternary composition in construction chemical composi-
tions including knifing fillers, screeds, and repair mortars,
tile adhesives, tiling grouts, plasters, base coats and sealings.

5 Claims, 2 Drawing Sheets

TERNARY HYDRAULIC BINDER COMPOSITION

The present invention relates to a ternary hydraulic binder composition comprising ye'elimte and calcium sulfate, and optionally belite, characterized by an added content of the mineralogical compound $C_{12}A_7$ (dodecacalcium heptaaluminate). Moreover, it relates to a process for the manufacture thereof, a process for the manufacture of a construction chemical composition including water, and the use of the ternary composition in construction chemical compositions comprising knifing fillers, screeds, and repair mortars, tile adhesives, tiling grouts, plasters, base coats and sealings.

Portland cement was first mentioned in British patent BP 5022 (Joseph Aspdin, 1824) and has since been continuously further developed. Modern Portland cement contains about 70% by weight of CaO+MgO, about 20% by weight of $SiO_2$ and about 10% by weight of $Al_2O_3+Fe_2O_3$. Portland cement hardens hydraulically. On the downside, the manufacture of Portland cement has a large environmental impact, i.e. a large $CO_2$ footprint.

Calcium aluminate cement ("CAS cement") predominantly comprises $CaO·Al_2O_3$. It can be obtained by melting calcium oxide (CaO) or limestone ($CaCO_3$) and bauxite or aluminate together. Calcium aluminate cement comprises about 20 to 40% by weight of CaO, up to about 5% by weight of $SiO_2$, about 35 to 80% by weight of $Al_2O_3$ and up to about 20% by weight of $Fe_2O_3$. Calcium aluminate cements are defined according to DIN EN 14647 (January 2006). Calcium aluminate cement has a smaller environmental impact, i.e. a smaller $CO_2$ footprint than Portland cement.

Calcium Sulfoaluminate cement ("CSA cement") is distinguished from Portland cement by fast bonding, fast strength development and shrinkage reduction. CSA cement was used for decades as a binder in concrete for bridges, airport runways, road repair, and many other applications where a quick setting is required. CSA cement is also used in dry mortars for self-levelling floors, levelling compounds, casting mortars, tile adhesives, grouts, etc. In contrast to Portland cement, CSA cement has a smaller environmental impact, i.e. a smaller $CO_2$ footprint, because it is calcinated at a lower temperature than Portland cement, i.e. at 1100 to 1300° C. Moreover, CSA cement is less alkaline than Portland cement. However, setting time, strength development and final strength of CSA cement still leave room for further improvement.

In order to accelerate the setting and hardening of CSA cement, lithium salts are often employed. However, lithium is globally in short supply, the manufacture thereof is environmentally critical and work conditions are humanly questionable, at best. There exists a need to reduce or completely avoid the addition of lithium required for acceleration.

In Cement Chemist Notation (CCN), the constituents of mineralogical compounds are generally mentioned in their oxide form. "C" stands for CaO, "A" stand for $Al_2O_3$, "S" stands for $SiO_2$, "$" hereinbelow stands for $SO_3$, and "H" stands for $H_2O$.

CSA cement contains the mineralogical compound $C_4A_3\$$ (ye'elimite) and calcium sulfate (gypsum, calcium sulfate hemihydrate, and/or anhydrite (hereinbelow collectively called $C\$H_x$ with x being a rational number from 0 to 2)). It may also contain substantial amounts of $C_2S$ (belite). Upon contact with water, it hydraulically hardens mainly forming ettringite ($C_6A\$_3H_{32}$).

U.S. Pat. No. 6,730,162 B1, corresponding to WO 01/74737 A1, discloses (abstract): a method of preparing a hydraulic binder wherein at least the following two binders are mixed together: a) a first hydraulic binder having as one of its main components the mineral compound $C_4A_3\$$; and b) a sulfate second binder based on calcium sulfate hemihydrate and/or anhydrite obtained by applying heat treatment to gypsum. It also provides a binder comprising amongst its main components: a) a mineral compound $C_4A_3\$$; and b) a compound comprising a hemihydrate of calcium sulfate of a or ß form and of general formula $CaSO_4·½H_2O$ and/or an anhydrite of III form of general formula $CaSO_4·εH_2O$ with & is in the range 0 to 0.5, preferably in the range 0.06 to 0.11, or an anhydrite of II form of formula $CaSO_4$.

DE 102010034874 A1 discloses (abstract): a mineral binder composition, containing A) at least one pozzolanically or latent hydraulically setting Material, B) at least one calcium sulfoaluminate and C) at least one calcium sulfate hemihydrate and/or calcium sulfate anhydrite, where the weight ratio of component A) to component B) from 5:1 to 1:10 and the weight ratio of component B) to component C) is from 50:1 to 1:2, as well as construction chemical products containing a corresponding mineral binder composition.

WO 2012/127066 A1 discloses (abstract): a dry cement composition for preparing a wet coating formulation consisting of mortar or concrete, enabling, in particular, the creation of thick non-efflorescent inorganic coatings without adversely affecting the other properties required for the corresponding wet formulation, namely handiness, workability, pumpability, rheology, ease of mixing and application, as well as ease of cleaning tools, and without adversely affecting the properties of the hardened objects obtained from said wet formulation, namely surface protection/sealing, hardness, resistance to cracks, durability, and fire resistance. The composition according to the invention includes (a) CAC and/or CSA and (c) anhydrite, and at least one of the following compositions: (b) an organic binder; (d) a setting retarder; (e) a setting accelerator; (f) a water-retaining agent; (g) a filler; (h) a waterproofing agent; (i) a coloring agent; (j) a photocatalytic additive; (k) fibers; and (m) an antifoaming agent. Said composition is (almost entirely) free of Portland cement, and the ratio of the composition (a)/(c) is between 90/10 and 99.99/0.01. The invention also relates to the wet formulation obtained by mixing the cement composition with water, to the methods for preparing the cement composition and the corresponding wet formulation, to the coating obtained by applying the wet formulation, to the application thereof, and to the coated substrates.

CN 109987906 A discloses (abstract): a cement-based high-early-strength non-shrinking grouting material. The grouting material comprises the following raw materials, in parts by weight: 50-55 parts of a high belite sulphoaluminate special cementing material, 5-10 parts of heavy calcium carbonate powder, 38-43 parts of quartz sand, 0.5-0.7 parts of latex powder, 0.5-0.7 parts of a water reducing agent, 0.36-0.5 parts of an antifoaming agent, 0.05-0.1 parts of cellulose ether, 0.1-0.15 parts of citric acid, and 0.03-0.05 parts of lithium carbonate, wherein the high belite sulphoaluminate special cementing material is obtained by performing dry blending on the following raw materials, in parts by weight: 60-70 parts of high belite sulphoaluminate cement clinker powder, 5-10 parts of alpha-type high-strength gypsum powder, 5-10 parts of beta-type gypsum powder, and 15-20 parts of ultra-fine fly ash. The grouting material provided has ultrahigh strength of 2-4 h of early age, excellent fluidity, long-term strength growth rate and long-term strength, and certain plastic expansion and rigid expansion after hardening.

CA 2922773 A1 discloses (p. 9) "Bamstone" CSA cement comprising 22% $C_2S$, 60% $C_4A_3\$$, 5% $C_{12}A_7$, 8% $C_3S$, and 4% $C_2(A,F)$. Additionally 0-20% calcium sulfate can be present.

US 2015/0329422 A1 discloses a binder composition comprising a mixture of 4-47% $C_4A_3\$$ and CA, 0-4% $C_{12}A_7$, 1-16% $C_4AF$, 5-19% $C_2S$. Sulfates can also be present.

US 2016/0107933 A1 discloses (abstract and claim 1) the use of a belite-containing calcium aluminate as an accelerator for Portland cement. Towards this end it furthermore discloses to add hydraulically reactive additives, such as amorphous calcium aluminate with a composition close to $C_{12}A_7$, to mixture of calcium sulphoaluminate based on ye'elimite, free lime and anhydrite. It does, however, not disclose an accelerator for CSA cement.

Chu Yong Sik et al., "Properties of Shrinkage Reducing Agent and Mortar with $C_{12}A_7$-based Slag and Petroleum Cokes Ash", Journal of the Korean Ceramic Society, Vol. 50. No. 5, pp. 319-325, 2013, discloses $C_{12}A_7$ slag for the shrinkage reduction of ordinary Portland cement ("OPC"). Besides the above-mentioned need of reducing or avoiding lithium salts, the problems underlying the present invention are: the binder composition should be free of Portland cement and thus have a lower pH value than Portland cement, it should dry, set and harden more quickly and exhibit higher durability of the hardened composition as compared to regular CSA cement with higher early and final strengths, and should be able to cure at lower temperatures.

These problems have been solved with the technical features of the independent claims. The dependent claims pertain to preferred embodiments. It has been surprisingly found that a composition comprising $C_4A_3\$$ and $C\$H_x$ is largely improved by the addition of $C_{12}A_7$.

The advantages of the ternary hydraulic binder composition according to the present invention are that it is low in lithium or even lithium-free, free of Portland cement, exhibits a small interval between the processing time and the solidification time as well as between the start and the end of solidification, an improved durability even under critical conditions, a faster drying speed, higher early and final strengths, higher strengths at low temperatures, earlier walkability and availability, reduced shrinkage, faster setting at low temperatures, very smooth surface structure, lower sensitivity to dispersion-based adhesives, improved processing properties, improved adhesive strength in the form of adhesive compositions, lower pH value, less efflorescence, improved natural stone suitability, all compared to conventional binary and ternary binder systems, and there is no need for additional chromate reduction.

According to a first aspect, the present invention provides a ternary hydraulic binder composition comprising the mineralogical compound $C_4A_3\$$ (ye'elimite) and a member selected from the group consisting of gypsum, calcium sulfate hemihydrate, anhydrite and mixtures thereof (collectively named $C\$H_x$ with x being a rational number from 0 to 2), characterized by an added content of the mineralogical compound $C_{12}A_7$ (dodecacalcium heptaaluminate).

The term "an added content", as that term is used throughout the specification, means that the CSA cement is spiked with additional $C_{12}A_7$. As it was explained hereinabove, CAS cements contain 0-4% or even 5% of $C_{12}A_7$. "An added content" of the mineralogical compound $C_{12}A_7$ means that the natural content is significantly increased by the addition of $C_{12}A_7$. If no $C_{12}A_7$ was present in the first place, 0.1% of $C_{12}A_7$ may suffice. If 1% of $C_{12}A_7$ is present, at least 0.5% of $C_{12}A_7$ should be added; if 5% of $C_{12}A_7$ is present, at least 2% of $C_{12}A_7$ should be added as a rule of thumb. The upper limit should be about 20% of $C_{12}A_7$.

Ye'elimite ($C_4A_3\$$) is the naturally occurring form of calcium sulfoaluminate, $Ca_4(AlO_2)_6SO_3$. Ye'elimite is most commonly encountered as a constituent of CSA cements. It is manufactured by heating the appropriate quantities of finely ground alumina, calcium carbonate and calcium sulfate to between 1100 to 1300° C., preferably in the presence of small quantities of fluxing materials, such as $Fe_2O_3$. On heating above 1350° C., ye'elimite will begin to decompose.

Calcium sulfate ($C\$H_x$) is the inorganic compound with the formula $CaSO_4$ and related hydrates. One particular hydrate is better known as Plaster of Paris, and another occurs naturally as the mineral gypsum. The main hydration states are anhydrite (x=0), hemihydrate (x=0.5) and dihydrate (gypsum, x=2). Calcium sulfate occurs technically as a waste product e.g. in flue-gas desulfurization.

Dodecacalcium heptaaluminate ($Ca_{12}Al_{14}O_{33}$ or $C_{12}A_7$) is an inorganic solid that occurs rarely in nature. It is an important phase in calcium aluminate cements and is an intermediate (at 900 to 1200° C.) in the manufacture of Portland cement. $C_{12}A_7$ can be prepared via a solid-state reaction, i.e., heating a mixture of calcium carbonate and aluminum oxide or aluminum hydroxide powders in air. It is commercially available.

The composition according to the invention may additionally contain $C_2S$ (belite). Belite is an industrial mineral, which is important in Portland cement manufacture. Its main constituent is dicalcium silicate, $Ca_2SiO_4$. Belite-rich CSA cement was developed to further improve the durability of CSA cements, while offering a lower environmental footprint than ordinary Portland cement ("OPC").

The mixture of $C_4A_3\$$ (ye'elimite), calcium sulfate ($C\$H_x$) and optionally $C_2S$ (belite), may be present in the form of a regular CSA cement. The components may, however, be mixed together as needed.

In compositions according to the present inventions, the added $C_{12}A_7$ amount can be 0.1 to 20% b.wt. An amount lower than 0.1% b.wt. would probably have no measurable effect while an amount of more than 20% would be a waste of valuable material. The added amount of $C_{12}A_7$ preferably ranges from 0.2 to 20% b.wt. and more preferably from 0.5 to 10% b.wt. If 1% of $C_{12}A_7$ is present in the CSA cement, at least 0.5% of $C_{12}A_7$ should be added. If 5% of $C_{12}A_7$ is present, at least 2% of $C_{12}A_7$ should be added as a rule of thumb.

In lithium-free compositions or compositions very low in lithium, it is advantageous to increase the $C\$H_x$ content of the CSA cement. To a typical CSA cement containing about 50% b.wt. of $C_4A_3\$$, about 25% b.wt. of $C_2S$, about 5% b.wt. of anhydrite, and other minor phases, about 35% b.wt. of calcium sulfate may be added before an excess of gypsum remains in the hydrated product.

General formulations are given hereinbelow (percentages are given in % b.wt.):

| Formulations without sand | |
| --- | --- |
| 24-64% | ye'elimite-rich clinker |
| 6-40% | calcium sulfate (total amount) |
| 0.2-20% | dodecacalcium heptaaluminate ($C_{12}A_7$) |

| Formulations with sand | |
| --- | --- |
| 30-75% | quartz sand |
| 0-40% | fine filler (e.g. limestone powder) |
| 12-32% | ye'elimite-rich clinker |
| 3-20% | calcium sulfate (total amount) |
| 0.1-20% | dodecacalcium heptaaluminate ($C_{12}A_7$) |
| 0-5% | pozzolanes |
| 0-20% | redispersible polymer powder (e.g. acrylate- or EVA copolymers) |
| 0-1% | lithium salts |
| 0-0.2% | retarders (e.g. tartaric acid) | and optionally further additives (e.g. thickeners, superplasticizers).

The above-mentioned further additives may be selected from adhesives, viscosifiers, superplasticizers, surfactants, fibers, complexing agents, shrinkage reducers, flexibilizers, hydrophobing agents, Portland cement, CAS cement, and mixtures thereof.

According to a second aspect, the present invention provides a process for the manufacture of the binder composition, comprising: providing a mixture of the mineralogical compound $C_4A_3\$$ (ye'elimite), a member selected from the group consisting of gypsum, calcium sulfate hemihydrate, anhydrite and mixtures thereof (collectively named $C\$H_x$ with x being a rational number from 0 to 2), and optionally the mineralogical compound $C_2S$ (belite), and adding 0.1-20% b.wt., preferably 0.5-10% b.wt., of $C_{12}A_7$ (dodecacalcium heptaaluminate). Preferably, water is also added before use of the binder composition.

According to a third aspect, the present invention provides the use of the mineralogical compound $C_{12}A_7$ (dodecacalcium heptaaluminate) as a hardening accelerator for a binder composition comprising $C_4A_3\$$, $C\$H_x$ and optionally $C_2S$.

Moreover, the present invention provides the use of the binder composition as described hereinabove comprising, but not limited to, knifing fillers, screeds, and repair mortars, tile adhesives, tiling grouts, plasters, base coats and sealings.

The present invention will now be explained in further detail with reference to the following nonlimiting Examples and Reference Examples, and with reference to the enclosed drawings.

The raw materials are given in percent by weight, "% b.wt." "Rp." means recipe. The expression (23/50) means that testing has been performed at 23° C. and 50% rel. humidity. The expression (5/90) means that testing has been performed at 5° C. and 90% rel. humidity.

"Fine filler" is limestone powder of about 1-45 μm particle size obtained from Rheinkalk GmbH. "Ye'elimite-rich clinker", containing about 50% b.w. of ye'elimite, is "i.Tech® ALICEM" obtained from Heidelberg Cement AG. "Calcium sulfate" is the calcium sulfate in the clinker plus any added calcium sulfate (anhydrite). $C_{12}A_7$ is "TERNAL EP" from IMERYS Aluminates. "Redispersible polymer powder" is an ethylene vinyl acetate copolymer commercially available as e.g. "VINNAPAS" from Wacker AG. The "retarder" is tartaric acid, and the "further additives" are viscosifiers and superplasticizers. "Pozzolane" is selected from metakaolin, microsilica, fly ash, glass powder, and mixtures thereof.

In the drawings

GENERAL METHOD

Water and powder temperatures are adjusted to 23° C.±1° C. In a polyethylene bucket with an electric drill as a stirrer, 1 kg of the sample and water are mixed until homogeneous and free of lumps (about one minute). Smaller batches may also be mixed in a kitchen bowl with an electric kitchen mixer.

Method A

A spatula is dipped into the mixed composition and pulled out at intervals of 5 minutes. The drops falling from the spatula fall back into the composition. If the drops are completely immersed in the surface of the composition, the composition can still be used. The end of the processing time is reached when a convex meniscus is formed on the surface of the composition by the falling drop. Method E is similar, but the consistency of the composition is here judged by an experienced worker.

Method B

A spreading table is leveled. A test ring is placed in the middle of the spreading table. A sufficient amount of a self-leveling composition is poured into the test ring at 23° C.±1° C. After e.g. 1, 10 or 15 minutes, the ring is quickly pulled upwards perpendicular to spreading table. The slump (i.e. the diameter of the slump) is measured twice after exactly one minute at right angles to one other. The average value is noted as the slump [cm].

Method D

Adhesive tensile strengths and sag resistance [mm] are measured according to DIN EN 12004-2:2017-05.

Example 1

| | Self-Levelling Composition | Reference 1 | Rp. 2 |
| --- | --- | --- | --- |
| | Quartz sand (0.1-0.3 mm) | 37.80 | 37.80 |
| | Fine filler | 36.75 | 33.75 |
| | Ye'elimite-rich clinker | 17.60 | 17.60 |
| | Calcium sulfate | 4.40 | 4.40 |
| | $C_{12}A_7$ | | 3.00 |
| | Redispersible polymer powder | 3.00 | 3.00 |
| | $Li_2CO_3$ | 0.02 | 0.02 |
| | Retarder | 0.08 | 0.08 |
| | Further additives | 0.35 | 0.35 |
| Methods | Water [g/kg] | 260.0 | 260.0 |
| Method A | Processing time [min] | 37 | 24 |

-continued

| Self-Levelling Composition | | Reference 1 | Rp. 2 |
|---|---|---|---|
| Vicat | Setting time start-end [min] (23/50) | 64-84 | 46-62 |
| (~DIN EN 13409) | Setting time start-end [min] (5/90) | 150-195 | 95-120 |
| Method B | Slump [cm] | 15 | 15 |
| (~DIN EN 12706) | | | |
| ~DIN EN ISO 2431 | Flow time [s] | 23 | 24 |
| DIN EN 13892-2 | Compressive strength/bending tensile strength 24 h [N/mm$^2$] (23/50) | 3.6/16.3 | 4.3/18.7 |
| | Compressive strength/bending tensile strength 28 d [N/mm$^2$] (23/50) | 5.2/20.2 | 7.2/31.3 |
| | Compressive strength/bending tensile strength 28 d [N/mm$^2$] (5/90) | 6.0/22.3 | 6.1/25.8 |
| Graf-Kaufmann | Shrinkage 28 d [mm/m] (23/50) | −0.7 | −0.5 |
| (~DIN EN 13872) | Shrinkage 28 d [mm/m] (5/90) | −1.1 | −0.7 |

Figure 1:
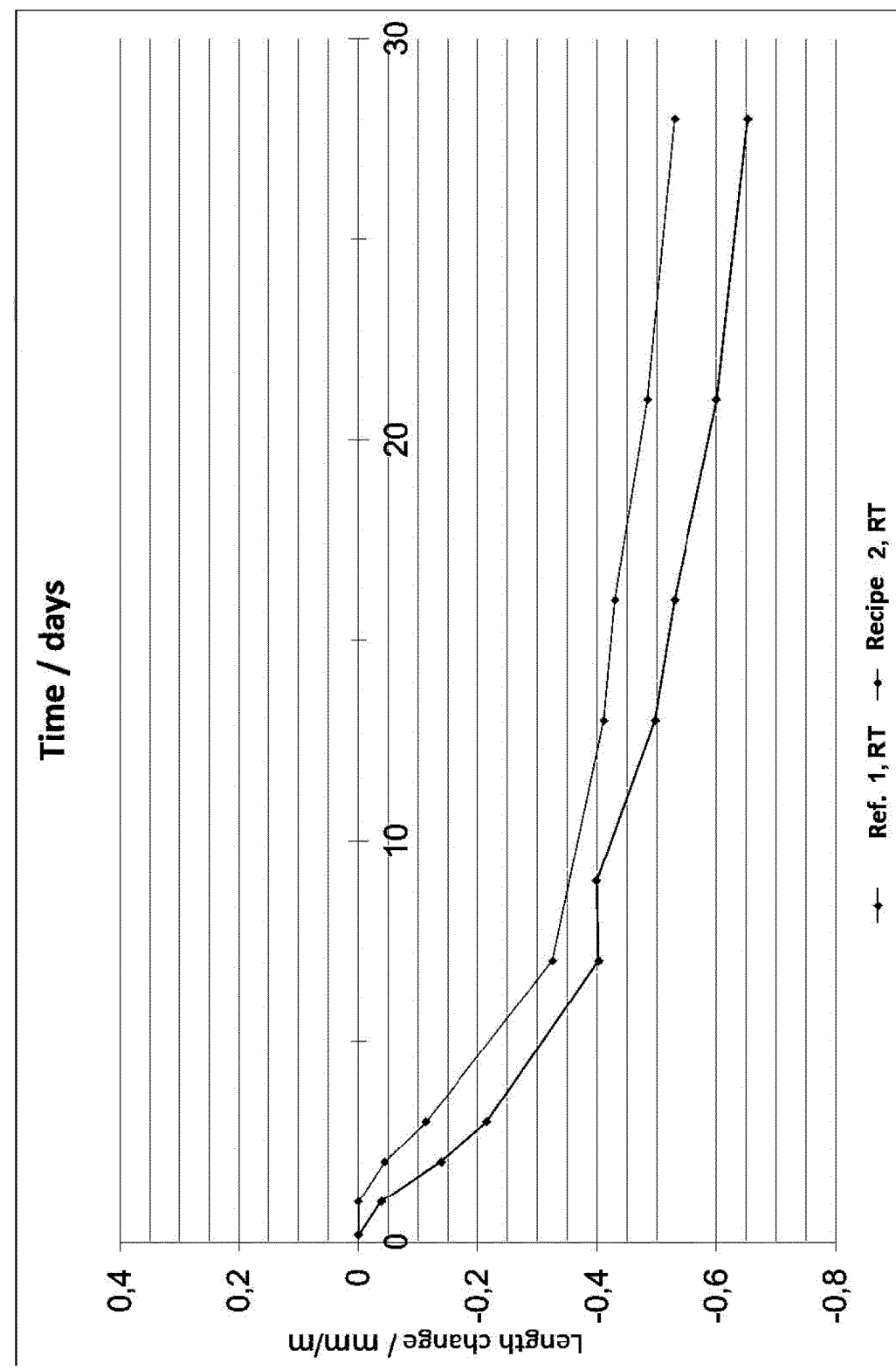
FIG. 1 shows the shrinkage of self-levelling compositions at room temperature.
Figure 2:
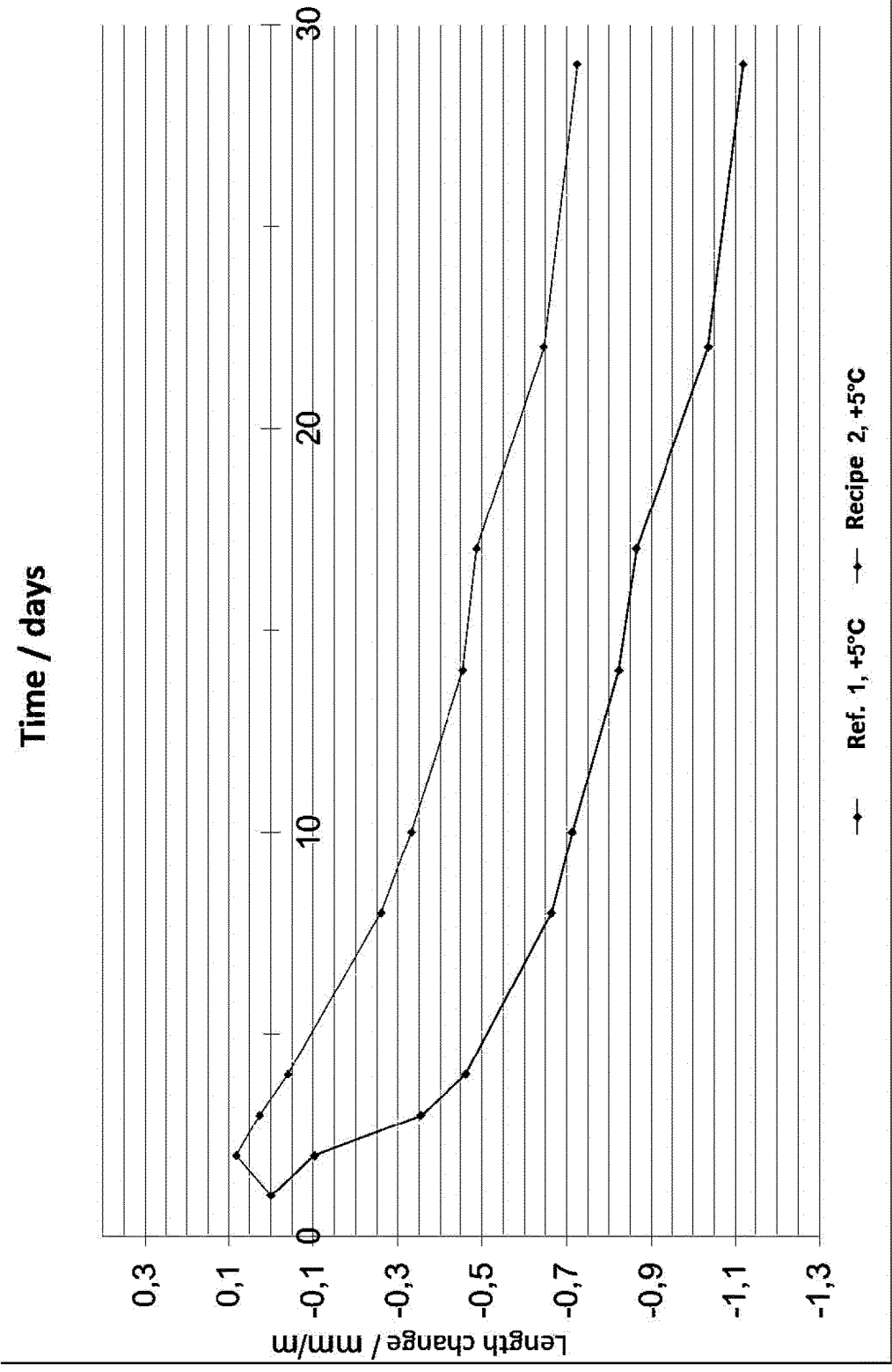
FIG. 2 shows the shrinkage of self-levelling compositions at +5° C.

When using $C_{12}A_7$ as an additive, the setting is accelerated in normal climates and at low temperatures, and the shrinkage is minimized. Also compressive strengths and bending tensile strengths are improved. The drawings FIG. 1 and FIG. 2 show much improved shrinkage values.

Example 2

| Self-Levelling Composition | | Reference 2 | Rp. 3 | Rp. 4 | Rp. 5 | Rp. 6 |
|---|---|---|---|---|---|---|
| | Quartz sand (0.1-0.3 mm) | 37.80 | 37.80 | 37.80 | 37.80 | 37.80 |
| | Fine filler | 25.77 | 20.77 | 25.77 | 25.77 | 25.77 |
| | Ye'elimite-rich clinker | 20.80 | 20.80 | 20.40 | 16.80 | 12.80 |
| | Calcium sulfate | 12.70 | 12.70 | 12.60 | 11.70 | 10.70 |
| | $C_{12}A_7$ | | 5.00 | 0.50 | 5.00 | 10.00 |
| | Redispersible polymer powder | 2.50 | 2.50 | 2.50 | 2.50 | 2.50 |
| | $Li_2CO_3$ | | | | | |
| | Retarder | 0.08 | 0.08 | 0.08 | 0.08 | 0.08 |
| | Further additives | 0.35 | 0.35 | 0.35 | 0.35 | 0.35 |
| Methods | Water [g/kg] | 260.0 | 260.0 | 260.0 | 260.0 | 260.0 |
| Method A | Processing time [min] | 47 | 28 | 45 | 33 | 34 |
| Vicat | Setting time start-end [min] (23/50) | 64-94 | 43-55 | 62-76 | 50-72 | 51-77 |
| (~DIN EN 13409) | | | | | | |
| Method B | Slump [cm] | 15 | 15 | 15 | 15 | 15 |
| (~DIN EN 12706) | | | | | | |
| ~DIN EN ISO 2431 | Flow time [s] | 22 | 18 | 21 | 20 | 19 |
| DIN EN 13892-2 | Compressive strength/bending tensile strength 4 h [N/mm$^2$] (23/50) | 2.0/6.5 | 2.1/13.5 | 1.9/6.9 | 2.3/9.6 | 1.9/8.1 |
| | Compressive strength/bending tensile strength 24 h [N/mm$^2$] (23/50) | 3.9/17.6 | 5.8/29.2 | 3.8/21.4 | 4.4/22.8 | 4.7/23.4 |
| | Compressive strength/bending tensile strength 28 d [N/mm$^2$] (23/50) | 8.2/36.5 | 9.4/49.6 | 9.5/40.5 | 8.9/44.2 | 6.2/47.9 |
| Graf-Kaufmann | Shrinkage 28 d [mm/m] (23/50) | −0.7 | −0.6 | −0.7 | −0.4 | 0.4 |
| (~DIN EN 13872) | | | | | | |

Using $C_{12}A_7$ as an additive results in higher (early) strengths, and the setting is accelerated. Shrinkage as well as expansion tend to be lower. The more $C_{12}A_7$ used, the higher the (early) strengths. However, an amount of 10% adversely affects the 4 h strengths and the shrinkage or expansion behavior, however the (early) strength and the setting are still good.

Example 3

| Tile Adhesive Composition | | Reference 3 | Rp. 7 | Rp. 8 | Rp. 9 |
|---|---|---|---|---|---|
| | Quartz sand (0.1-0.3 mm) | 63.64 | 63.14 | 59.64 | 53.64 |
| | Ye'elimite-rich clinker | 24.00 | 24.00 | 24.00 | 24.00 |
| | Calcium sulfate | 6.00 | 6.00 | 6.00 | 6.00 |
| | $C_{12}A_7$ | | 0.50 | 4.00 | 10.00 |
| | Pozzolane | 2.44 | 2.44 | 2.44 | 2.44 |
| | Redispersible polymer powder | 2.50 | 2.50 | 2.50 | 2.50 |
| | $Li_2CO_3$ | 0.05 | 0.05 | 0.05 | 0.05 |
| | Retarder | 0.18 | 0.18 | 0.18 | 0.18 |
| | Further additives | 1.19 | 1.19 | 1.19 | 1.19 |
| Methods | Water [g/kg] | 260.0 | 260.0 | 260.0 | 260.0 |
| Method D | Sag resistance [mm] | 1 | 1 | 1 | 1 |
| Method E | Processing time [min] | 60 | 60 | 45 | 30 |
| Vicat | Setting time start-end [min] (23/50) | 90-110 | 75-90 | 50-65 | 30-50 |

-continued

| Tile Adhesive Composition | | Reference 3 | Rp. 7 | Rp. 8 | Rp. 9 |
|---|---|---|---|---|---|
| Vicat | Setting time start-end [min] (5/90) | 150-195 | 120-160 | 60-105 | 30-45 |
| DIN EN 12004-1: 2017-05 | Adhesive tensile strength 3 h [N/mm²] (23/50) | 0.9 | 1.0 | 1.3 | 1.0 |
| | Adhesive tensile strength 6 h [N/mm²] (23/50) | 1.4 | 1.4 | 1.6 | 1.5 |
| | Adhesive tensile strength 28 d [N/mm²] (23/50) | 2.3 | 2.2 | 2.5 | 2.5 |
| | Adhesive tensile strength 28 d, wet [N/mm²] (23/50) | 1.1 | 1.0 | 1.1 | 1.0 |
| | Adhesive tensile strength 28 d, warm [N/mm²] (23/50) | 1.9 | 2.3 | 2.1 | 1.8 |
| | Adhesive tensile strength 28 d, open time (E) [N/mm2] (23/50) | 0.5 | 0.7 | 0.0 | 0.0 |
| Graf-Kaufmann | Shrinkage 28 d [mm/m] (23/50) | −1.0 | −0.7 | −0.7 | — |

Using $C_{12}A_7$ as an additive results in higher (early) strengths, setting is accelerated and shrinkage is reduced. The more $C_{12}A_7$ is used, the higher the (early) strengths. However, a quantity of 10% adversely affects the (early) strengths.

Example 4

| Tile Adhesive Composition | | Reference 4 | Rp. 10 | Reference 5 | Rp. 11 |
|---|---|---|---|---|---|
| | Quartz sand (0.1-0.3mm) | 59.64 | 59.64 | 59.60 | 59.58 |
| | Ye'elimite-rich clinker (~50% ye'elimite) | 27.20 | 24.00 | 27.20 | 24.00 |
| | Calcium sulfate | 6.80 | 6.00 | 6.80 | 6.00 |
| | $C_{12}A_7$ | | 4.00 | | 4.00 |
| | Pozzolane | 2.44 | 2.44 | 2.44 | 2.44 |
| | Redispersible polym. powd. | 2.50 | 2.50 | 2.50 | 2.50 |
| | $Li_2CO_3$ | 0.05 | 0.05 | 0.05 | 0.05 |
| | Retarder | 0.18 | 0.18 | 0.22 | 0.24 |
| | Further additives | 1.19 | 1.19 | 1.19 | 1.19 |
| Methods | Water [g/kg] | 260.0 | 260.0 | 260.0 | 260.0 |
| Method D | Sag resistance [mm] | 0 | 1 | 0 | 0 |
| Method E | Processing time [min] | 45 | 45 | 60 | 55 |
| Vicat | Setting time start-end [min] (23/50) | 50-75 | 50-65 | 65-95 | 60-85 |
| Vicat | Setting time start-end [min] (5/90) | 115-170 | 60-105 | 125-170 | 105-135 |
| DIN EN 12004-1: 2017-05 | Adhesive tensile strength 6 h [N/mm²] (23/50) | 1.5 | 1.6 | 1.4 | 1.6 |
| | Adhesive tensile strength 28 d [N/mm²] (23/50) | 2.2 | 2.5 | 2.4 | 2.3 |
| | Adhesive tensile strength 28 d, wet [N/mm²] (23/50) | 0.9 | 1.1 | 1.0 | 1.0 |
| | Adhesive tensile strength 28 d, warm [N/mm²] (23/50) | 1.3 | 2.1 | 1.1 | 1.4 |
| Graf-Kaufmann | Shrinkage 28 d [mm/m] (23/50) | −0.7 | −0.7 | — | — |
| | Shrinkage 28 d [mm/m] (5/90) | 0.6 | 0.2 | — | — |

When using $C_{12}A_7$ as an additive, higher (early) strengths result, the setting is accelerated in normal climates and at low temperatures, and the shrinkage or expansion behavior minimized.

Example 5

| Tile Adhesive Composition | | Reference 5 | Rp. 12 |
|---|---|---|---|
| | Quartz sand (0.1-0.3 mm) | 54.60 | 63.14 |
| | Ye'elimite-rich clinker | | 24.00 |
| | Calcium sulfate | | 6.00 |
| | $C_{12}A_7$ | | 0.50 |
| | Calcium aluminate (CA) | 7.90 | |
| | Portland cement | 30.30 | |

-continued

| Tile Adhesive Composition | | Reference 5 | Rp. 12 |
|---|---|---|---|
| | Pozzolane | 2.44 | 2.44 |
| | Redispersible polymer powder | 3.0 | 2.5 |
| | $Li_2CO_3$ | 0.25 | 0.05 |
| | Retarder | 0.16 | 0.18 |
| | Further additives | 1.35 | 1.19 |
| Methods | Water [g/kg] | 270.0 | 260.0 |
| Method D | Sag resistance [mm] | 0 | 1 |
| Method E | Processing time [min] | 55 | 60 |
| Vicat | Setting time start-end [min] (23/50) | 65-85 | 75-90 |
| Vicat | Setting time start-end [min] (5/90) | 195-330 | 120-160 |
| DIN EN 12004-1: 2017-05 | Adhesive tensile strength 6 h [N/mm$^2$] (23/50) | 0.4 | 1.4 |
| | Adhesive tensile strength 28 d [N/mm$^2$] (23/50) | 1.3 | 2.2 |
| | Adhesive tensile strength 28 d, wet [N/mm$^2$] (23/50) | 0.7 | 1.0 |
| | Adhesive tensile strength 28 d, warm [N/mm$^2$] (23/50) | 1.4 | 2.3 |
| Graf-Kaufmann | Shrinkage 28 d [mm/m] (23/50) | −4.6 | −0.7 |

When using $C_{12}A_7$ as an additive, faster setting times at 5° C. and higher early strengths are obtained in CSA cement instead of OPC while using much lower amounts of binders and lithium salts.

The invention claimed is:

1. A method for accelerating the setting and hardening, improving the hydration performance, or reducing the shrinkage of a binder composition comprising:
   24-64% b.wt. of a mineralogical compound $C_4A_3\$$,
   6-40% b.wt. of $C\$H_x$, wherein $C\$H_x$ is a member selected from the group consisting of gypsum, calcium sulfate hemihydrate, anhydrite and mixtures thereof and wherein x being a rational number from 0 to 2,
   0-5% b.wt. of a mineralogical compound $C_{12}A_7$, and optionally $C_2S$, the method comprising incorporating an additional amount of 0.2-20% b.wt. of the mineralogical compound $C_{12}A_7$ into the binder composition.

2. The method of claim 1, wherein the mineralogical compound $C_{12}A_7$ improves the hydration performance of the binder composition.

3. The method of claim 1, wherein the mineralogical compound $C_{12}A_7$ reduces the shrinkage of the binder composition.

4. The method of claim 1, wherein the mineralogical compound $C_{12}A_7$ accelerates the setting and hardening of the binder composition.

5. The method of claim 1, wherein the binder composition is present in the form of a CSA cement.

* * * * *